April 4, 1950     F. A. LANE     2,503,159

ROTARY-TO-OSCILLATORY MOTION CONVERTER

Filed April 19, 1947     3 Sheets-Sheet 1

INVENTOR.
FRED A. LANE,
BY: Harold B. Hood.
ATTORNEY.

April 4, 1950  F. A. LANE  2,503,159

ROTARY-TO-OSCILLATORY MOTION CONVERTER

Filed April 19, 1947  3 Sheets-Sheet 2

INVENTOR.
FRED A. LANE,
BY: Harold B. Hood.
ATTORNEY.

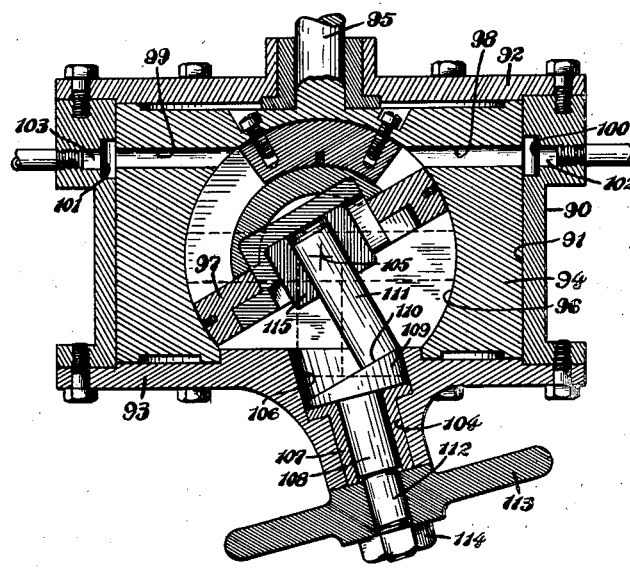
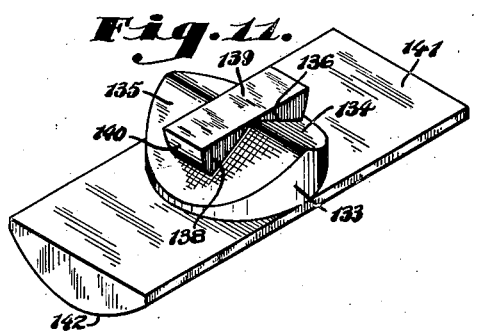
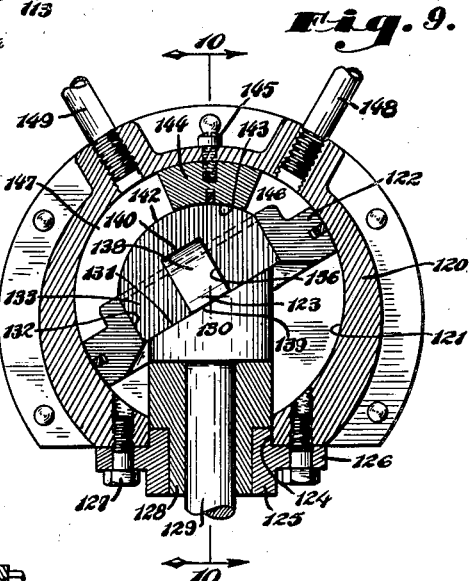
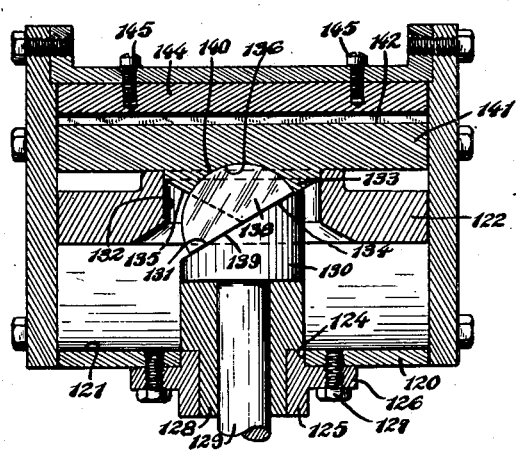

Patented Apr. 4, 1950

2,503,159

UNITED STATES PATENT OFFICE 2,503,159

ROTARY-TO-OSCILLATORY MOTION CONVERTER

Fred A. Lane, Shelburn, Ind., assignor to Lane Motors, Inc., Terre Haute, Ind., a corporation of Indiana Application April 19, 1947, Serial No. 742,638

7 Claims. (Cl. 74—70)

The present invention relates to a motion converter, and particularly to a device of that character adapted to convert rotary motion to oscillatory or rocking motion. The invention finds its primary utility in pumping mechanism; and the various forms specifically disclosed herein are so illustrated and will be so described; but it will be obvious that the oscillatory motion, resulting from the action of the disclosed mechanisms, may be applied to any desired function.

Specific objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 8 is a section similar to Fig. 5, and showing a further modified form of my invention;

Fig. 9 is a section similar to Fig. 2, and showing another form of my invention;

Fig. 10 is a longitudinal section through the embodiment of Fig. 9, taken substantially on the line 10—10 of Fig. 9 and looking in the direction of the arrows; and Fig. 11 is a perspective view of an insert comprising a feature of the embodiment illustrated in Figs. 9 and 10.

Figure 1:
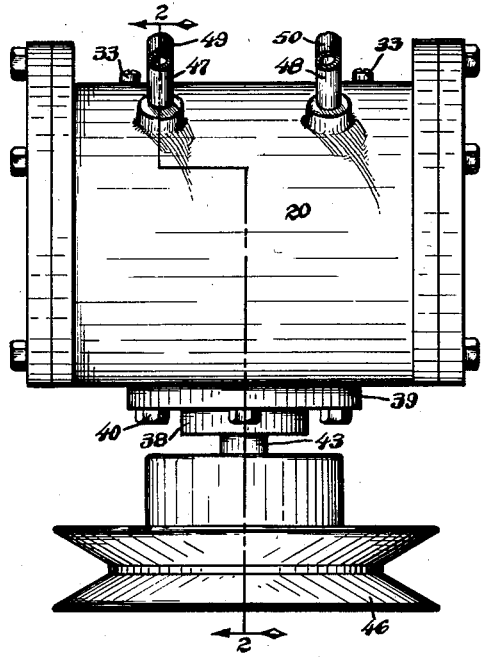
Fig. 1 is an elevation of one embodiment of my invention.
Figure 2:
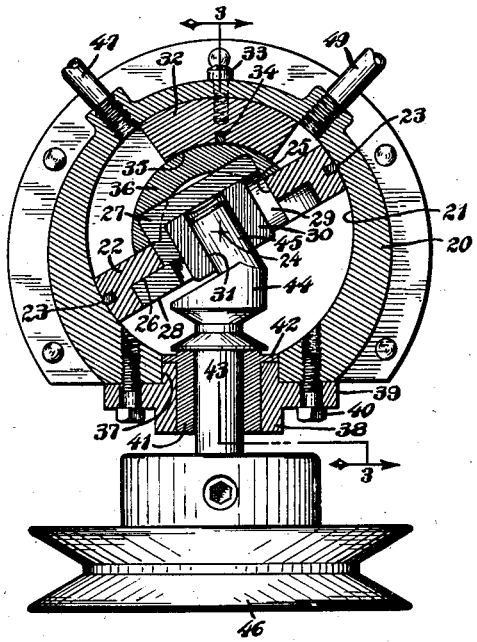
Fig. 2 is a transverse section thereof taken substantially on the line 2—2 of Fig. 1 and looking in the direction of the arrows.
Figure 3:
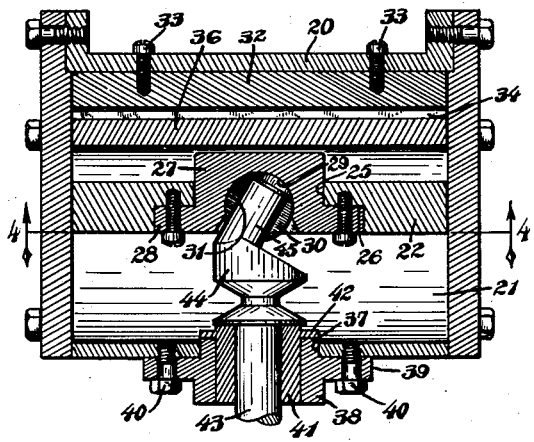
Fig. 3 is a longitudinal section therethrough, taken substantially on the line 3—3 of Fig. 2 and looking in the direction of the arrows, the stem having been rotated through 90 degrees from the position of Fig. 2.
Figure 4:
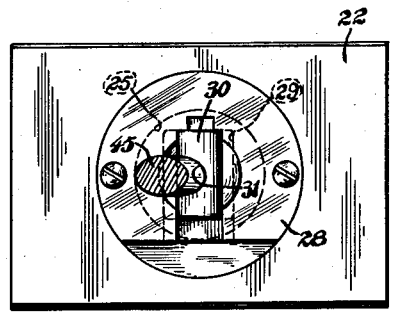
Fig. 4 is a longitudinal section, showing the oscillating plate and the stem parts operatively associated therewith, taken substantially on the line 4—4 of Fig. 3 and looking in the direction of the arrows.

Referring more particularly to the form of invention illustrated in Figs. 1 to 4, it will be seen that I have shown a housing 20 in which is provided a cylindrical chamber 21 in which is oscillably mounted a plate 22, diametrically spanning the chamber 21, and extending from end to end thereof. Preferably, the lateral edges of the plate 22 will carry resilient sealing elements 23 for maintaining a fluid-tight relation between said edges and the internal wall of the chamber 21. The plate 22 is mounted to oscillate about an axis disposed at the center of the circular cross section of the chamber 21, and indicated by the reference numeral 24.

The plate 22 is formed with a central socket 25, opening through one side of the plate. In the illustrated embodiment of the invention, said socket comprises an opening extending entirely through the plate, and countersunk, as at 26, on the lower face of the plate, for the reception of a separate element 27, having a flange 28 received in the countersink 26 and suitably secured in place. The use of the element 27 facilitates the provision of a part cylindrical socket 29, arranged upon an axis which, when the parts are assembled, is diametrically related to the chamber 21. A bushing 30 is oscillably received in said socket 29; and it is to be noted that the axial length of the bushing is slightly less than the length of the socket 29, whereby said bushing may have slight axial movement, as well as rocking movement about its axis, in said socket. The bushing is formed with a transverse bore 31 for a purpose which will later become apparent.

Suitably secured within the chamber 21, and extending from end to end thereof, is a dam 32 which may be held in place by screws 33, or the like. Resilient sealing means, indicated at 34, will preferably be provided in the inner, arcuate face 35 of said dam, said face 35 being concentric with the chamber 21. An element 36, providing an arcuate outer surface, is suitably carried on the upper face of the plate 22, and constantly engages the face 35 of the dam 32, to provide a liquid-tight seal therebetween.

At a point diametrically opposite the position of the dam 32, the housing 20 is provided with a port 37 in which is mounted a bearing 38 having a peripheral flange 39 suitably secured to the housing by means of screws 40, or the like. A bushing 41 is carried in said bearing 38 and near its inner end is provided with a flange 42 overlying the inner end of the bearing 38. A stem 43 is journalled in the bushing 41; and the arrangement is such that, when the above-described parts are in place, they provide a fluid-tight seal for the opening 37.

Within the chamber 21, the stem 43 is formed to provide a head 44 carrying a finger 45, of cylindrical cross section, arranged upon an axis angularly related to the axis of the stem 43, and intersecting said axis at the center 24 of the cross section of the chamber 21, said finger 45 being received in the transaxial bore 31 of the bushing 30.

In assembling the structure above-described, the bushing 30 is inserted in the bore 29 by axial movement through the open righthand end of said bore. Thereafter, the element 27 is entered in the opening 25 and its flange 28 is secured in place in the countersink 26. The element 36, which may alternatively be integral with the plate 22, is likewise assembled with said plate. Now the plate and its associated parts are entered in the chamber 21 through one end thereof, and the closure heads are mounted upon the housing 20.

Now, the finger 45 and head 44 are introduced into the chamber 21 through the opening 37 and, by properly tilting the stem, the finger 45 can be introduced into the bore 31. As the finger 45 finds its seat in said bore, the stem 43 will align itself with the axis of the opening 37. Now, the bushing 41 having been assembled with the bearing 38, that assembly is sleeved onto the stem 43 and introduced into the opening 37, whereafter the screws 40 may be seated to hold the assembly 38–41 in place. Thereafter, a V-pulley 46 may be mounted on the protruding end of the stem 43.

It will be seen that the plate 22, the element 36, and the dam 32 cooperate to divide the chamber 21 into separate, fluid-sealed, variable-volume chambers. An inlet pipe 47 opens into one of said chambers and an inlet pipe 49 opens into the other of said chambers, while an outlet pipe 48 opens into the first of said chambers, being axially spaced from the pipe 47, and an outlet pipe 50, similarly spaced from the pipe 49, opens into the other of said chambers.

It will be obvious upon inspection that, when the stem 43 is rotated about its axis, the coaction of the finger 45 with the bushing 30 will cause the plate 22 to oscillate about the axis of the cylindrical chamber 21, while the bushing 30 will be caused to oscillate about its own axis within the socket 29. Oscillation of the plate 22 will oppositely vary the effective volumes of the two chambers defined between opposite edges of the plate 22 and the dam 32. Thus, as the plate moves in a clockwise direction from the position illustrated in Fig. 2, fluid will be drawn into the righthand chamber through the inlet pipe 49 and fluid will be forced out of the lefthand chamber through the pipe 48. Conversely, as the plate returns to its illustrated position, fluid will be drawn into the lefthand chamber through the pipe 47 and discharged from the righthand chamber through the pipe 50. Of course, suitable check valves will be arranged in the inlet and outlet pipes.

Figure 5:
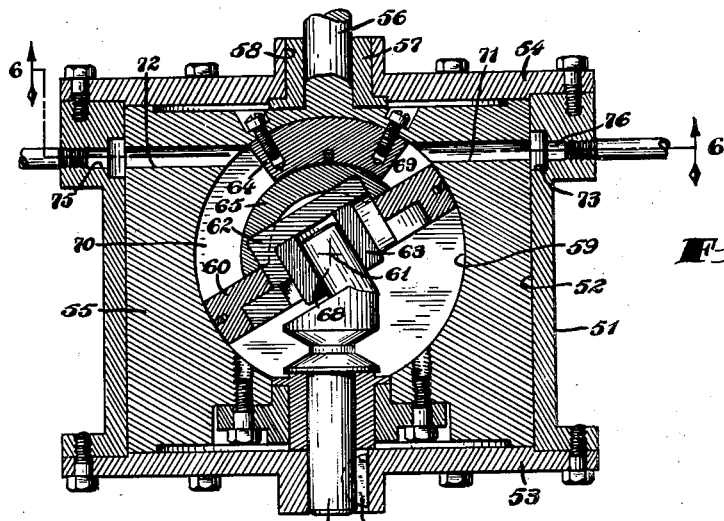
Fig. 5 is a section, similar to the section of Fig. 2, but showing a modified embodiment of my invention.
Figure 6:
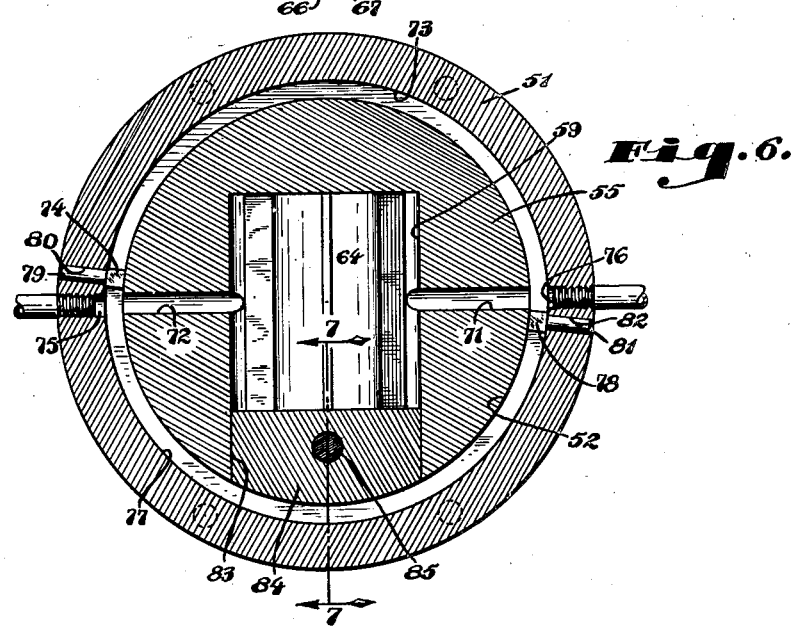
Fig. 6 is a transverse section therethrough taken substantially on the line 6—6 of Fig. 5 and looking in the direction of the arrows.
Figure 7:
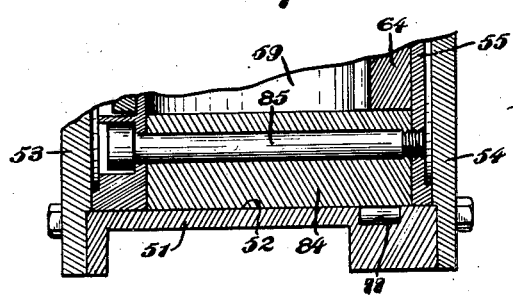
Fig. 7 is a fragmental longitudinal section, taken substantially on the line 7—7 of Fig. 6 and looking in the direction of the arrows.

In the embodiment of my invention illustrated in Figs. 5 to 7, the stem with its angularly related finger is held stationary, while the housing in which the plate-receiving chamber is formed, is rotated about an axis coincident with the stem axis. In said embodiment, a casing 51 is formed to provide a cylindrical surface 52, the opposite ends of said casing being closed by removable heads 53 and 54. Journalled within said casing and upon said surface 52, for rotation therewithin, is a housing 55 axially provided with a stem 56 journalled in a bushing 57 mounted in a central opening 58 in the closure head 54. Said housing 55 is formed to provide a cylindrical chamber 59 whose axis is arranged to intersect perpendicularly the axis of the stem 56 which, of course, is coincident with the axis of rotation of the housing 55.

A plate 60, similar in all respects to the plate 22, is mounted within the chamber 59 for oscillation about the center 61 of the cross section of the chamber 59. As in the previously described embodiment, an element 62 centrally carried by the plate 60 receives a bushing 63 for oscillation upon an axis perpendicularly intersecting the axis of the chamber 59, and having a transaxial bore. A dam 64 cooperates with an element 65 in the manner described above in the discussion of the dam 32 and element 36. A stem 66 is mounted upon an axis perpendicularly intersecting the axis of the chamber 59, and is held against rotation relative to the casing 51 by any suitable means, such as a key 67 engaging said stem and the wall of an opening in the closure head 53 through which said stem projects. Within the chamber 59, the stem is provided with an angularly arranged finger 68 whose axis intersects the stem axis and the axis of the chamber 59 at a common point, said finger being operatively received in the transaxial bore of the bushing 63.

As in the previously described embodiment, the plate 60, the dam 64, and the element 65 cooperate to define two variable-volume chambers 69 and 70, fluid sealed from each other. A bore 71 provides communication between the chamber 69 and the external cylindrical surface of the housing 55, while a bore 72 provides communication between the chamber 70 and the external cylindrical surface of said housing, the mouths of said bores opening through said surface at diametrically opposed points. The casing 51 is internally formed to provide a substantially semi-circular groove or channel 73 separated, by a dam 74, from communication with a port 75 but communicating with a port 76; and with a second substantially semi-circular groove or channel 77 separated by a dam 78 from communication with the port 76 but communicating with the port 75. Preferably, the dams 74 and 78 are constructed as illustrated, in order to simplify the machining operation in the production of the grooves 73 and 77. The casing may be formed with a radial opening 80 in which is removably received a stem 79 of the dam 74, and the casing is formed, at a diametrically opposed point with an opening 82 in which is received the similar stem 81 of the dam 78. Obviously, the grooves 73 and 77 are axially positioned for registration with the bores 71 and 72.

An extension 83 of the chamber 59 opens through the peripheral surface of the housing 55, and may be closed, after introduction of the plate 60 and its associated parts, by a plug 84, held in place by a screw 85, in the manner particularly illustrated in Figs. 6 and 7.

It will be clear from the above description that, if the casing 51 is held against rotation and the housing 55 is rotated, by driving the stem 56, the plate 60 will be carried with the housing 55 and the coaction of the finger 68 and the bushing 63 will be equivalent to the coaction of the finger 45 and bushing 30 in the embodiment illustrated in Figs. 1 to 4. Thus, the plate 60 will be oscillated about the axis 61 to vary inversely the volumes of the chambers 69 and 70. Either of the ports 75 and 76 may be an inlet port, and the other will be an outlet port. Assuming that the port 75 is the inlet port, the housing 55 will be rotated in a clockwise direction, as viewed in Fig. 6. As the parts move from the position illustrated, the bore 72 will pass the dam 74 to come into communication with the channel 73, just as the plate 60 begins to swing in a clockwise direction from its position illustrated in Fig. 5. Clockwise movement of said plate will, of course, reduce the effective diameter of the chamber 70, thereby forcing fluid within said chamber to escape through the channel 73 and the port 76. Coincidentally, the bore 71 will be moved into communication with the channel 77 so that, as the volume of the chamber 69 is increased, fluid will be drawn into said chamber through the port 75, channel 77, and bore 71. Conversely, as the plate 60 begins to return to its illustrated position, the bore 71 will pass the dam 74 into communication with the channel 73, and the bore 72 will pass the dam 78 into communication with the channel 77, so that flow through the bores 71 and 72 will be reversed and fluid will be discharged from the chamber 69 to the port 76 and drawn into the chamber 70 through the port 75.

In Fig. 8, I have disclosed a modification of the structure illustrated in Figs. 5 to 7, including means for varying the effective stroke of the oscillable plate. In that figure, I have shown a casing 90 providing a cylindrical internal surface 91, together with closure heads 92 and 93. A housing 94 is journalled in the surface 91 and is provided with a stem 95 whose axis is coincident with the axis of rotation of the housing 94. The housing is formed to provide a cylindrical chamber 96 in which is oscillably mounted a plate 97, similar to the plate 60 in all respects. The ports 98 and 99, similar to ports 71 and 72, communicate with the two variable-volume chambers defined by the plate 97, and with channel sections 100 and 101 corresponding to the channel sections 73 and 77. Ports 102 and 103 correspond to the ports 76 and 75.

In this embodiment of my invention, the closure head 93 is formed with an opening 104 disposed upon an axis angularly inclined to the axis of the stem 95, and meeting said axis at the center 105 of the cross section of the chamber 96. At its inner end, the opening 104 is formed with an enlarged section 106. Said opening receives a bushing 107 in which is journalled a stem 108 terminating, at its inner end, in a head 109 journalled in the enlargement 106 and formed to define an inclined surface 110. The plane of the surface 110 meets the axis of the stem 108 in an angle complementary to the angle at which the axis of the stem 108 meets the axis of the stem 95. Fixed to said head 109 upon an axis normal to said surface 110 is a finger 111 received in a transaxial bore in a bushing 115 mounted in the plate 97 in a manner corresponding to the mounting of the bushing 63 in the plate 60. The axis of said stem 111 intersects the axis of the bore 96 at the point at which the axes of the stems 95 and 108 intersect said chamber axis.

With the parts in the positions illustrated in solid lines in Fig. 8, the operation of this embodiment of the invention will be identical with the operation of the embodiment illustrated in Fig. 5. But the stem 108 is provided with a reduced extension 112 upon which is mounted a hand wheel 113 against which engages a set nut 114 threaded on said extension 112. Upon slightly loosening said nut 114, the hand wheel 113 may be moved to shift the stem 108 about its axis, thereby moving the finger 111 to any desired position between that illustrated in solid lines and that illustrated in the dotted lines in Fig. 8. It will be seen that, when the finger 111 is in the dotted line position, its axis will coincide with the axis of the stem 95, which is the axis of rotation of the housing 94; and that, when the parts are in such a position, the plate 97 will be held fixedly in its position illustrated in dotted lines in Fig. 8. With the parts in such position, relative rotation between the housing 94 and the finger 111 will not produce any oscillation of the plate 97. Intermediate positions of the finger 111 will cause relative rotation between the housing 94 and casing 90 to produce varying degrees of oscillation of the plate 97. By this means, the volume of fluid thrown by the illustrated mechanism, upon rotation of the stem 95 at a uniform velocity, may be varied at will between zero and the maximum capacity of the pumping mechanism. It will be clear that the illustrated mechanism may be used to drive a fluid motor, in which case the illustrated mechanism will act as a variable speed transmission.

In Figs. 9 to 11 I have shown still another embodiment of my invention. In that embodiment, a housing 120 is formed to provide a cylindrical chamber 121 in which is mounted a plate 122 for oscillation about the axis 123 of the chamber 121. A radial opening 124 in said housing is adapted to receive a bearing 125 in which is carried a bushing 128 providing a journal mounting for a stem 129. Within the chamber 121, said stem carries a head 130 which, in the assembled condition of the parts, is located within the chamber 121, and terminates in a plane surface 131 inclined at an acute angle to the axis of the stem 129 and to the axis of the chamber 121. The bearing 125 makes a fluid-tight fit in the opening 124, and is provided with a peripheral flange 126 penetrated by screws 127 adapted to be threaded into suitable openings in the housing 120.

The plate 122 is formed with a central aperture 132 in which is received a plug 133 formed to present, for supporting engagement with the surface 131, a median surface arranged diametrically of the chamber 121 and flanked by upwardly inclined surfaces 134 and 135, projecting upwardly and toward the opposite ends of the chamber 121, respectively. The median surface, which extends diametrically of the chamber 121, is so located as always to be in contact with the surface 131; and, as the head 130 rotates, its outermost portion will successively sweep the surfaces 134 and 135, whereby rotation of said head 130 will result in oscillation of the plate 122 about the center 123.

Medially, the plug 133 is formed with an arcuate slot 136 extending longitudinally of the plate 122; and a semi-disc-shaped block 138 is mounted in said slot for rocking movement therein. Said block 138 is formed with a plane surface 139 always held in sliding engagement with the surface 131, when the parts are in assembled relation; and as the head 130 rotates, the block 138 will rock, about an axis coincident with the median surface of the plug 133, to preserve an operative contact between the head 130 and the plate 122, the surface 140 opposite the surface 139 sliding in the arcuate base of the slot 136.

Preferably, the plug 133 is integral with an elongated bar 141 seating in an upper surface of the plate 122 to prevent relative rotation between the parts; and the upper surface of said bar 141 will preferably be arcuate in cross section, as indicated at 142, for sealing engagement with the arcuate face 143 of a dam 144, extending from end to end of the chamber 121, and secured in place in said chamber, diametrically opposite the opening 124, by means of screws 145, or the like. The plate 122, the bar 141, and the dam 144 cooperate to define fluid-tight separated spaces 146 and 147, variable in volume upon oscillation of the plate 122. I have shown inlet pipes 148 and 149 for the variable-volume chambers, respectively; and it will be recognized, of course, that outlet pipes for said chambers are likewise provided, though they are not shown, the arrangement being similar to that illustrated in Figs. 1 to 4.

I claim as my invention:

1. In a device of the class described, a housing providing a chamber of substantially circular cross section, a plate received in said chamber for oscillation about an axis coincident with the center of such cross section, said plate being formed with an opening therethrough traversing said axis, a member seated in and closing said opening, said member being provided with a part cylindrical seat, open at one end and perpendicularly intersecting said axis when said member is so seated, a bushing rockably received in said seat and provided with a cylindrical, transaxial socket, an element mounted upon an axis intersecting said first-named axis and having a cylindrical portion acutely angularly related to said first-named axis and received in said socket, and means for producing relative rotation between said element and said housing and plate about the intersection of said element portion with said axis to produce oscillation of said plate about said axis.

2. In a device of the class described, a housing providing a chamber of substantially circular cross section, a plate received in said chamber for oscillation about an axis coincident with the center of such cross section, said plate being formed with an opening therethrough traversing said axis, a member seated in and closing said opening, said member being provided with a part cylindrical seat, open at one end and perpendicularly intersecting said axis when said member is so seated, a bushing rockably received in said seat and provided with a cylindrical, transaxial socket, a stem associated with said housing and mounted on an axis intersecting said first-named axis, an element disposed in said chamber, supported by said stem, and projecting therefrom in a direction angularly related to the axis of said stem, said element intersecting said first-named axis and being operatively received in said socket to intersect said first-named axis, and means for producing relative rotation between said element and said housing and plate about the point of intersection of said element with said first-named axis.

3. In a device of the class described, a housing providing a chamber of substantially circular cross section, a plate received in said chamber for oscillation about an axis coincident with the center of such cross section, said plate being formed with an opening therethrough traversing said axis, a member seated in and closing said opening, said member being provided with a part cylindrical seat, open at one end and perpendicularly intersecting said axis when said member is so seated, a bushing rockably received in said seat and provided with a cylindrical, transaxial socket, a stem associated with said housing and mounted upon an axis intersecting said first-named axis, said stem and housing being mounted for relative rotation about the point of intersection of said axes, and an element carried by said stem and angularly related to the axis thereof, said element being rotatably received in said socket, said plate and said housing being held against relative rotation about said first-named axis of rotation.

4. In a device of the class described, a housing providing a chamber of substantially circular cross section, a plate received in said chamber for oscillation about an axis coincident with the center of such cross section, a stem mounted upon an axis perpendicular to said first-named axis and entering said chamber, said stem and said housing being associated for relative rotation, a bushing operatively associated with said plate, said bushing being rockable relative to said plate about an axis perpendicular to said first-named axis and being lineally movable upon said axis, and a finger fixedly associated with said stem, angularly related to said stem axis, and intersecting said first-named axis and said stem axis in a common point, said finger being rotatably associated with said bushing.

5. In a device of the class described, a housing providing a chamber of substantially circular cross section, a plate received in said chamber for oscillation about an axis coincident with the center of such cross section, a stem mounted upon an axis perpendicular to said first-named axis and entering said chamber, said stem and housing being associated for relative rotation, a bushing operatively associated with said plate, said bushing having a transaxial socket therein and being rockable relative to said plate about an axis perpendicular to said first-named axis and being lineally movable upon said axis, and a finger fixedly associated with said stem, angularly related to said stem axis, and intersecting said first-named axis and said stem axis in a common point, said finger being rotatably received in said bushing socket.

6. In a device of the class described, a casing, a housing mounted for rotation in said casing and providing a chamber having a circular cross section whose center lies in the axis of rotation of said housing, a plate mounted in said chamber for oscillation about said center and diametrically spanning said chamber, a stem journalled in said casing upon an axis angularly related to said axis of housing rotation and intersecting the same at said chamber center, a finger eccentrically mounted on said stem upon an axis angularly related to said stem axis and intersecting the same at said chamber center, said finger extending into said chamber, and means providing an operative connection between said finger and said plate whereby rotation of said housing produces oscillation of said plate, the position of said finger axis being shiftable, by rotative adjustment of said stem, between coincidence with said axis of housing rotation and a maximum angularity relative thereto.

7. The device of claim 6 including a dam projecting into said chamber, means carried by said plate cooperating with said dam to define fluid-tightly separated spaces on opposite sides of said dam, and an inlet port and an outlet port for each of said spaces.

FRED A. LANE.

REFERENCES CITED

The following references are of record in the file of this patent:

UNITED STATES PATENTS

| Number | Name | Date |
| --- | --- | --- |
| 2,413,636 | Long | Dec. 31, 1946 |